May 27, 1958     W. H. ARMACOST     2,835,965
METHOD OF WELDING
Filed Aug. 24, 1956
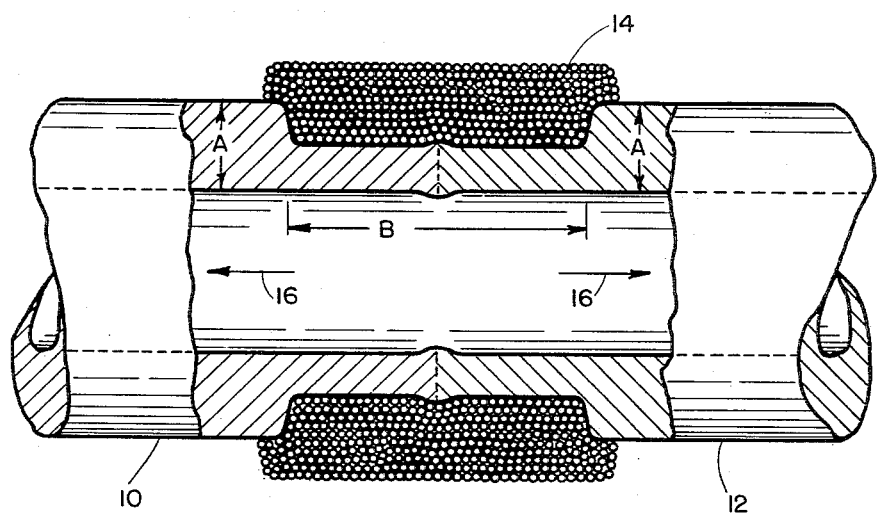
INVENTOR
WILBUR H. ARMACOST
BY
*Eldon H. Luther*
ATTORNEY

2,835,965

METHOD OF WELDING

Wilbur H. Armacost, Scarsdale, N. Y., assignor to Combustion Engineering, Inc., New York, N. Y., a corporation of Delaware Application August 24, 1956, Serial No. 606,164

2 Claims. (Cl. 29—470.5)

This invention relates to an improved method of butt joining tubes and particularly to a method of butt joining very thick walled metallic tubes by pressure welding.

With the advent of the so-called supercritical boilers wherein steam pressures of 5000 p. s. i. and steam temperatures of 1100° F. and above are encountered, one of the problems that has arisen is the butt welding of thick walled tubes that are necessarily employed in these boilers. It will be appreciated that in order to withstand these very high pressures at these very high temperatures the tubes must be fabricated of a metal having a high strength at high temperature and that in addition the walls of the tubes must be extremely thick. As the wall thickness of the tubes that are butt joined increases the difficulty in effecting such a juncture by pressure welding increases since it becomes extremely difficult to satisfactorily heat the tube ends to produce a proper pressure weld. In butt joining tubes by pressure welding it is essential that only the very end of the tube be heated to the required welding temperature and that the tube end be heated substantially uniformly across its face since if any substantial axial extent of the tube is heated a substantial "upset" (radial flow of metal) will occur greatly restricting or closing entirely the tube while if the tube end is not heated uniformly across it an unsatisfactory weld will be produced. Butt joining tubes by pressure welding is accomplished by placing the tube ends adjacent one another in opposing relation, positioning an induction coil about these tube ends and thereby heating the very ends of the tubes and thereafter forcing the tube ends into engagement. As the wall thickness of the tube increases the problem of heating only the very end of the tube and of uniformly heating the tube end across its face becomes more difficult and experience has shown that with a wall thickness of about 1½" and above it is extremely difficult if not impossible to obtain a satisfactory pressure weld.

To overcome this difficulty the present invention makes use of the fact that the longitudinal stress in a conduit as a result of the development of high pressure within the conduit is approximately only one half of the circumferential stress so that the wall thickness at the location of the juncture of these tubes may be reduced approximately one half of its original dimension so that tubes with a wall thickness of about twice the previously mentioned 1½" may be pressure welded, or in other words, tubes with wall thicknesses that vary from about 1½" to somewhat less than 3 inches. The resulting pressure welding of these tubes at the location of this reduced wall thickness has the required strength to resist the longitudinal stress developed and additional means are wrapped about the juncture of the tubes throughout the entire length of the reduced wall portion to provide the required strength necessary to resist the circumferential stress developed, with this additional means adding nothing in the way of resisting the longitudinal stress. Advantage is also taken of the fact that with a wire wrapping about this joint of reduced wall thickness uniform stress throughout the full length of the joint may be had with this being extremely important in high temperature and high pressure work and furthermore the joint may be wrapped so that the re-enforcing is substantially greater than that theoretically required to withstand the designed conditions thereby resulting in greatly reducing the stress within the weld.

In accordance with the present invention the thick walled tubes, which have a wall thickness of at least about 1½" but less than about 3", have their wall thickness reduced adjacent the ends to be joined together to an extent (somewhat less than 1½ inches) which will permit the satisfactory pressure welding together of the tubes without undue difficulty, with this reduction of wall thickness being effected by reducing the outside diameter of the tubes adjacent these ends relative to that of the remaining portion of the tubes while maintaining the inside diameter substantially unchanged. These tubes are then positioned in coaxial juxtaposed relation and the ends pressure welded together. Thereafter, wire is wound around the reduced portion of these ends in helical layers, throughout the entire axial length thereof and to a radial extent so that the weakening in hoop strength occasioned by the reduction in wall thickness is greatly more than offset and with the coefficient of thermal expansion of the wire so wrapped around the tubes being the same as that of the tubes.

It is accordingly an object of this invention to provide an improved method of satisfactorily butt joining a pair of metallic tubular members by pressure welding with the wall thickness of the members being between about 1½ inches and somewhat less than 3 inches.

Other and further objects of the invention will become apparent to those skilled in the art as the description proceeds.

The invention will be more fully understood from the following description when considered in conjunction with the accompanying drawing forming a part thereof and in which the single figure represents a longitudinal sectional view of a butt joint made in accordance with the invention.

Referring now to the drawing there is depicted therein a pair of tubular members 10 and 12 which have their ends disposed in coaxial relation. These tubes are thick walled with the wall thickness, indicated as A in the drawing, being in the neighborhood of 1½ inches or greater but less than about 3 inches so that it is extremely difficult, if not impossible, to butt join these tubes by pressure welding in normal fashion.

The wall thickness of these tubes is reduced for a short distance from the ends that are to be joined together by reducing the outside diameter of the tubes with the inside diameter remaining unchanged so as to provide a uniform flow area after the tubes are joined. The tubes have their wall thickness reduced in this manner sufficiently so that the ends may be satisfactorily butt joined by pressure welding, i. e., so the wall thickness is less than about 1½ inches with the reduction not being more than one-half the original wall thickness. After effecting this reduction in wall thickness the tubes are positioned in coaxial relation and pressure welded together in the normal way.

After the tubes have been welded together the joint is wrapped with wire 14 which must have the same coefficient of thermal expansion as the tube metal. The wire wrapping extends throughout the entire axial length of the reduced end portions, i. e., throughout the distance indicated as B, with the wire being wrapped in helical fashion and many more layers being provided than is required to offset the decrease in hoop strength that is occasioned by the reduction in wall thickness of the tubes. This greatly reduces the stress within the weld over that which would prevail if only the amount of re-enforcing that is theoretically required were used.

It is essential that the wrapping be wire because it is necessary that there be uniform stress throughout the extent of the reduced portion of the joined tube ends since otherwise uneven stresses would develop in the proximity of the weld and these uneven stresses would be very likely to cause failure of the weld with this being particularly important when the tubular members are subjected to great variations in temperature as well as high pressure. The properties of wire are such that all the turns of the wire will eventually take uniform stress even though the wrapping may initially not be uniform wherefore the stress in the reduced wall portions of the tubes will also be uniform and accordingly the stresses in the vicinity of the weld will be uniform.

Since the longitudinal stresses acting in the direction of arrows 16 will be only half the circumferential stresses in the tube walls occasioned by the action of the pressure within the tubes, the wall thickness adjacent the ends that are to be joined together may be reduced to approximately one half of its theoretically required thickness. When this is done the weld is sufficiently strong to withstand the longitudinal stresses and the reduced wall thickness together with wire wrapping 14 is more than sufficient to withstand the circumferential stresses developed by the pressure within the tubes.

Thus with the method of this invention the problem of butt joining metallic tubes by pressure welding where the wall thickness is so great as to render the pressure welding thereof impracticable, i. e., is between about 1½ inches and somewhat less than 3 inches, is overcome with the stresses in the tube wall adjacent the weld being uniform so that the weld may withstand the very high pressure and temperature changes to which it would be subjected in the operation of a supercritical boiler and with the stresses within the weld being very low as a result of the large amount of re-enforcement that may be utilized.

It will be understood that the above description is intended for the purpose of illustration only and that modifications such as will occur to those skilled in the art are possible and are embraced within the spirit and scope of the invention.

This application is a continuation in part of application Serial No. 535,186 filed September 19, 1955, and now abandoned.

What is claimed is:

1. The method of butt joining a pair of metallic tubes having a wall thickness between about 1½ inches and less than 3 inches, comprising reducing the wall thickness thereof adjacent the ends to be joined to less than 1½ inches, positioning said ends in coaxial juxtaposed relation, pressure welding the end surfaces of these reduced end portions together, winding wire under predetermined tension about said reduced portion of said ends throughout the axial length thereof and to a radial extent sufficient so that weakening in hoop strength occasioned by the reduction in wall thickness is offset with the wires being wound in helical fashion with axially adjacent windings being juxtaposed, said wire having a coefficient of thermal expansion that is the same as that of the elements.

2. The method of butt joining a pair of metallic tubes having walls of a thickness between about 1½ inches and less than 3 inches so as to render pressure welding thereof impracticable but not impracticable if the wall thickness were reduced not more than one-half its original value, comprising reducing the wall thickness of the members adjacent the ends to be joined to a thickness less than 1½ inches, effecting such reduction by reducing the outside diameter adjacent these ends relative to that of the remaining portion of the members while maintaining the inside diameter substantially unchanged, positioning said ends in coaxial juxtaposed relation, welding the end surfaces of these reduced portions together, by the pressure welding process, winding wire in close helical fashion to produce tight coils and under predetermined tension about said reduced portion throughout the full axial extent thereof a plurality of times thereby forming a plurality of superimposed helical coils with there being a sufficient number of such coils so that the resulting hoop strength at the location of the reduced wall portion will be substantially greater than that in the remaining portion of the tubular members, said wire having a coefficient of thermal expansion that is the same as that of the elements.

References Cited in the file of this patent
UNITED STATES PATENTS 2,373,038     Lindsay     Apr. 3, 1945
2,391,747     Schoessow     Dec. 25, 1945